US009624993B2

(12) United States Patent
Apfel et al.

(10) Patent No.: US 9,624,993 B2
(45) Date of Patent: Apr. 18, 2017

(54) HAND-HELD WORK IMPLEMENT AND PROCESS FOR PRODUCING A BRAKING DEVICE OF A HAND-HELD WORK IMPLEMENT (71) Applicant: ANDREAS STIHL AG & CO. KG, Waiblingen (DE)

(72) Inventors: Norbert Apfel, Waiblingen (DE); Manfred Schumacher, Leutenbach (DE); Ralf Cornelsen, Aspach (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 240 days.

(21) Appl. No.: 14/226,957

(22) Filed: Mar. 27, 2014

(65) Prior Publication Data
US 2014/0291080 A1    Oct. 2, 2014

(30) Foreign Application Priority Data
Mar. 27, 2013 (DE) .................... 10 2013 005 287

(51) Int. Cl.
*F16D 65/10* (2006.01)
*F16D 49/08* (2006.01)
(Continued)

(52) U.S. Cl.
CPC ............ *F16D 49/08* (2013.01); *B27B 17/083* (2013.01); *F16D 49/02* (2013.01); *F16D 65/04* (2013.01);
(Continued)

(58) Field of Classification Search
CPC ........... B27B 17/083; F16D 2200/0004; F16D 2250/0053; F16D 49/02; F16D 49/08; F16D 65/04; F16D 65/065; F16D 65/10
(Continued)

(56) References Cited

U.S. PATENT DOCUMENTS

| 4,024,933 A * | 5/1977 | Hinderks | ................ F16D 49/12 |
| | | | 188/259 |
| 4,635,364 A | 1/1987 | Noll | |
(Continued)

FOREIGN PATENT DOCUMENTS

| DE | 32 09 162 A1 | 9/1983 |
| DE | 38 02 488 A1 | 8/1989 |
(Continued)

OTHER PUBLICATIONS

Extended European Search Report, Appl. No. 14001016.6, Oct. 23, 2014, 5 pgs.

*Primary Examiner* — Robert A Siconolfi
*Assistant Examiner* — Mahbubur Rashid
(74) *Attorney, Agent, or Firm* — Paul D. Strain, Esq.; Strain & Strain PLLC (57) ABSTRACT A hand-held work implement having a tool has a braking device for the tool that includes a brake band which wraps around a brake drum. The brake band and the brake drum undergo friction as they move relative to one another during braking. At least one of the band or drum comprises an austenitic steel, a duplex steel, super duplex steel, a nickel-base alloy or a cobalt-base alloy and has a base body and a marginal layer. The hardness of the marginal layer is approximately 150% to approximately 600% of the hardness of the base body and the carbide proportion in the marginal layer is less than approximately 0.5% by weight. A process for production of the foregoing includes diffusing carbon and/or nitrogen into a marginal layer at a temperature of less than 500° C.

14 Claims, 1 Drawing Sheet (51) Int. Cl.
  *B27B 17/08* (2006.01)
  *F16D 65/04* (2006.01)
  *F16D 69/04* (2006.01)
  *F16D 65/06* (2006.01)
  *F16D 49/02* (2006.01)
  *F16D 69/02* (2006.01)

(52) U.S. Cl.
  CPC ............ *F16D 65/065* (2013.01); *F16D 65/10* (2013.01); *F16D 69/04* (2013.01); *F16D 69/027* (2013.01); *F16D 2200/0004* (2013.01); *F16D 2250/0053* (2013.01)

(58) Field of Classification Search
  USPC ...................................... 188/218 R
  See application file for complete search history.

(56) References Cited

U.S. PATENT DOCUMENTS

| | | | | |
|---|---|---|---|---|
| 4,949,818 | A * | 8/1990 | Siede | ................ B27B 17/083 188/251 M |
| 6,315,234 | B1 * | 11/2001 | Oishi | .................. B65H 59/04 242/421.8 |
| 2007/0034456 | A1 * | 2/2007 | Chung Lee | ............. F16D 49/08 188/2 D |

FOREIGN PATENT DOCUMENTS

DE    10 2004 060 016 A1    6/2006
DE        195 81 791 B4    5/2008

* cited by examiner

HAND-HELD WORK IMPLEMENT AND PROCESS FOR PRODUCING A BRAKING DEVICE OF A HAND-HELD WORK IMPLEMENT

CROSS-REFERENCE TO RELATED PATENT APPLICATIONS

This application is based upon and claims the benefit of priority from prior German Patent Application No. 10 2013 005 287.4, filed Mar. 27, 2013, the entire contents of which are incorporated herein by reference in their entirety.

BACKGROUND

The application relates to a hand-held work implement having a braking device and a process for producing the braking device as set forth herein. In an exemplary embodiment of the hand-held work implement, the hand-held work implement has a tool and a braking device for the tool. The braking device itself includes a brake band, which wraps around a brake drum, and the brake band and the brake drum form a first part and a second part undergoing friction. The first part and second part undergoing friction move relative to one another during the braking operation. The first part undergoing friction is an austenitic steel, a duplex steel, super duplex steel, a nickel-base alloy or a cobalt-base alloy and has a base body and a marginal layer. The hardness of the marginal layer is approximately 150% to approximately 600% of the hardness of the base body and the carbide proportion in the marginal layer is less than approximately 0.5% by weight.

In an exemplary embodiment of a process for producing the braking device for the hand-held work implement, carbon and/or nitrogen is made to diffuse into a marginal layer of the first part undergoing friction at a temperature of less than 500° C.

It is known from DE 38 02 488 A1 to coat brake bands, which can serve, for example, for stopping the saw chain of a power saw. The coating can be effected, for example, with aluminum oxide in a plasma coating process. On account of such a coating of the brake band, it is possible to realize short braking times combined with a high service life of the brake band. However, a coating of this type is relatively complex and therefore expensive.

DE 195 81 791 B4 discloses a frictional pairing for a synchronizing device in gear change transmissions, in which one of the parts undergoing friction is a ferritic or austenitic steel with a high chromium content and a carbide-rich zone comprising at least 30% by volume carbides. It is also provided to carburize the two parts undergoing friction at 1050° C. in an oxygen-free atmosphere. Chromium mixed carbides thereby form in the layer close to the surface. Components having a carburized surface are brittle. A brake band of a braking device of a hand-held work implement having such a surface might break during operation, since, on account of the severe heating of the brake band during the braking operation, austenitization repeatedly occurs during operation, as a result of which the brake band is embrittled.

From DE 10 2004 060 016 A1, it is also known, for a frictional pairing, to treat one of the parts undergoing friction initially by a hardening process, such as case hardening. Case hardening, too, is usually effected at very high temperatures of above 900° C.

The brochure entitled "Kolsterisieren" [Kolsterizing] from Bodycote Hardiff BV, Apeldoorn, The Netherlands discloses a process for surface hardening austenitic, stainless steel, in which carbon is made to diffuse into the surface of the material at low temperatures. In this process, no carbides are formed. The "kolsterized" surface is intended to have an increased wear resistance and avoid fretting at sliding surfaces. The tendency toward adhesion is to be reduced.

One object of the present application is to provide a hand-held work implement of the generic type, the braking device of which has a high service life and affords good braking results. Another object of the invention to specify a process for producing a braking device of a hand-held work implement which has a high service life and achieves short braking times.

SUMMARY OF PREFERRED EMBODIMENTS

In terms of the hand-held work implement, this object is achieved in one embodiment of a hand-held work implement having a tool and a braking device for the tool. The braking device itself includes a brake band, which wraps around a brake drum, and the brake band and the brake drum form a first part and a second part undergoing friction. The first part and second part undergoing friction move relative to one another during the braking operation. The first part undergoing friction is an austenitic steel, a duplex steel, super duplex steel, a nickel-base alloy or a cobalt-base alloy and has a base body and a marginal layer. The hardness of the marginal layer is approximately 150% to approximately 600% of the hardness of the base body and the carbide proportion in the marginal layer is less than approximately 0.5% by weight.

In terms of the process, the object is achieved by diffusing carbon and/or nitrogen into a marginal layer of the first part undergoing friction at a temperature of less than 500° C.

In one embodiment, it has been found that a marginal layer having a hardness of approximately 150% to 600% of the hardness of the base body and having a carbide proportion of less than 0.5% by weight not only has a high wear resistance, but also surprisingly achieves very good braking performances. Compared to an untreated part undergoing friction, the braking times can be halved or even reduced to one third. The first part undergoing friction is in this case an austenitic steel, a duplex steel, a super duplex steel, a nickel-base alloy or a cobalt-base alloy. The marginal layer achieves a significant reduction in braking times. The marginal layer can be produced by the diffusion of carbon and/or nitrogen at a temperature of less than approximately 500° C. On account of the low temperature required, the production is relatively simple and inexpensive. In the event of carbon diffusion, the process is referred to as "KOLSTERIZATION" (registered trade mark of Bodycote plc.). In the event of carbon diffusion, carbon atoms are incorporated in the matrix of the steel. The majority of the carbon atoms in this case do not react with the material of the first part undergoing friction, and therefore no carbides form and the carbide proportion in the marginal layer is less than approximately 0.5% by weight.

In another embodiment, the marginal layer has a high toughness and low-temperature toughness. As a result, it is possible to avoid surface cracks and long service lives are achieved. Both the wear on the first part undergoing friction and also the wear on the second part undergoing friction are reduced by the marginal layer having a hardness of approximately 150% to approximately 600% of the hardness of the base body and a carbide proportion of less than approximately 0.5% by weight. The marginal layer is advantageously merely a diffusion zone, but not a layer applied to the base body, and therefore spalling of the marginal layer is avoided. The low proportion of carbides prevents embrittlement of the part undergoing friction.

In still another embodiment, the marginal layer advantageously has a thickness of approximately 5 µm to approximately 50 µm. A thickness of the marginal layer of approximately 15 µm to approximately 35 µm is regarded as particularly advantageous. The layer thickness of the marginal layer is accordingly very small. The layer thickness is less than the wear to the first part undergoing friction during operation. It has surprisingly been found that the considerable shortening of the braking time is also achieved when the wear exceeds the original thickness of the marginal layer. It is assumed that the atoms which have been made to diffuse into the matrix diffuse further to the base body when the part undergoing friction is heated during the braking operation.

In a further embodiment, nitrogen can also be made to diffuse into the marginal layer for increasing the hardness compared to the hardness of the base body. If nitrogen is made to diffuse into the marginal layer, the nitrogen is advantageously incorporated in the matrix of the first part undergoing friction. The majority of the nitrogen atoms do not react with the material of the first part undergoing friction, and therefore the nitride proportion in the marginal layer is small. The nitride proportion in the marginal layer is advantageously less than approximately 1%, in particular less than approximately 0.5%.

In another further embodiment, if carbon is made to diffuse into the marginal layer, the carbon content in the marginal layer is advantageously approximately 1% by weight to approximately 7% by weight. If nitrogen is made to diffuse into the marginal layer, the nitrogen content in the marginal layer is advantageously approximately 5% by weight to approximately 12% by weight. The hardness of the marginal layer is advantageously increased significantly by carbon and/or nitrogen which has been made to diffuse. The hardness of the base body is advantageously approximately 200 HV to approximately 400 HV. The hardness of the marginal layer can be in the range of approximately 700 HV to approximately 1200 HV. On account of the high hardness of the marginal layer, the wear resistance is increased greatly.

In still a further embodiment, it is advantageous that the first part undergoing friction is the brake band. However, provision can also be made for the first part undergoing friction to be the brake drum. The first part undergoing friction is particularly advantageously a stainless, austenitic steel and the second part undergoing friction is a steel with a body-centered cubic and/or tetragonally distorted lattice structure.

In yet another embodiment, for a process for producing a braking device of a hand-held work implement, it is provided that a first part undergoing friction is an austenitic steel, a duplex steel, a super duplex steel, a nickel-base alloy or a cobalt-base alloy, and that carbon and/or nitrogen is made to diffuse into a surface layer of the first part undergoing friction at a temperature of less than 500° C.

In still another further embodiment, the hardness of the marginal layer can be increased considerably by the diffusion of carbon and/or nitrogen. On account of the low temperatures, inexpensive production of the marginal layer is possible. As a result of the fact that carbon and/or nitrogen are made to diffuse into the matrix of the base material, embrittlement of the material is avoided.

In yet a further embodiment, the diffusion of nitrogen and/or carbon is advantageously effected over a long period of time of more than 48 hours, in particular more than 96 hours. The carbon and/or nitrogen can be made to diffuse, for example, over six to seven days. In the event of carbon diffusion at temperatures of below 500° C., in particular of below 300° C., no carbides form in the marginal layer. The carbide proportion in the marginal layer is less than approximately 0.5% by weight. In the event of nitrogen diffusion at temperatures of below 500° C., in particular of below 300° C., no nitrides form in the marginal layer. This avoids embrittlement of the marginal layer. Residual compressive stresses are induced in the marginal layer by the carbon atoms and/or nitrogen atoms which have been made to diffuse. As a result, the dynamic strength is improved. It has been found to be particularly advantageous if only carbon has been made to diffuse into the marginal layer.

Further objects, features, and advantages of the present application will become apparent form the detailed description of preferred embodiments which is set forth below, when considered together with the figures of drawing.

BRIEF DESCRIPTION OF THE DRAWINGS

An exemplary embodiment of the invention will be explained hereinbelow with reference to the drawing, in which.

DETAILED DESCRIPTION OF PREFERRED EMBODIMENTS

Figure 1:
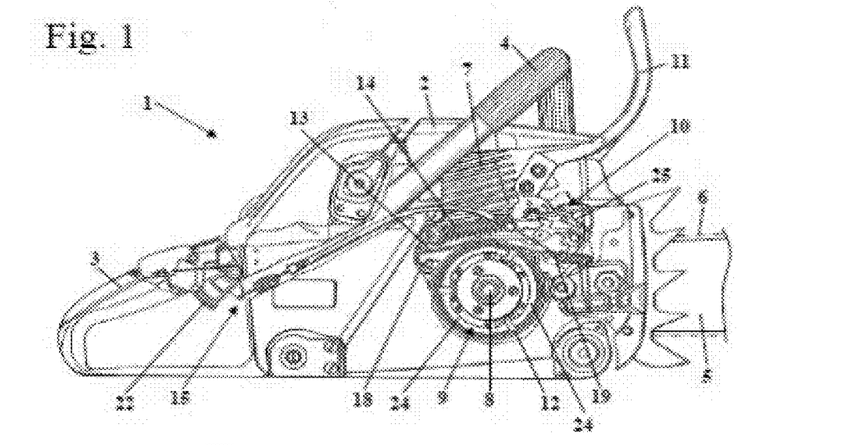
FIG. 1 shows a schematic side view of a power saw.

Turning to the figures of drawing, the power saw 1 shown in FIG. 1 has a housing 2, on which a rear handle 3 and a tubular handle 4 for guiding the power saw 1 are fixed. The power saw 1 has a guide bar 5, which protrudes forwards at the front side of the housing 2 remote from the rear handle 3. A saw chain 6 is arranged circumferentially on the guide bar 5. The saw chain 6 is driven in a circulating manner by a combustion engine 7 arranged in the housing 2. Instead of the combustion engine 7, provision can also be made of an electric motor, which is advantageously supplied with energy via a power cable, by a battery or by a rechargeable battery. The combustion engine 7 is in the form of a single-cylinder engine. Advantageously, the combustion engine 7 is a two-stroke engine or a mixture-lubricated four-stroke engine. The combustion engine 7 has a crankshaft 8, which is connected via a centrifugal clutch 9 to a pinion, which is not shown in FIG. 1 and drives the saw chain 6.

The centrifugal clutch 9 has a brake drum 12, against which centrifugal weights 24 of the centrifugal clutch 9 are pressed during operation on account of the centrifugal force. The brake drum 12 is part of a braking device 10 of the power saw 1. In addition to the brake drum 12, the braking device 10 comprises a brake band 13, which wraps around the brake drum 12 on the external circumference thereof. In the non-activated state, the brake band 13 lies at a small radial distance from the circumference of the brake drum 12. When the braking device 10 is activated, the loop formed by the brake band 13 is tightened and the brake band 13 is pressed against the circumference of the brake drum 12, such that the brake drum 12 is stopped. Provision can also be made for the brake band 13 to only partially wrap around the brake drum 12.

Figure 2:
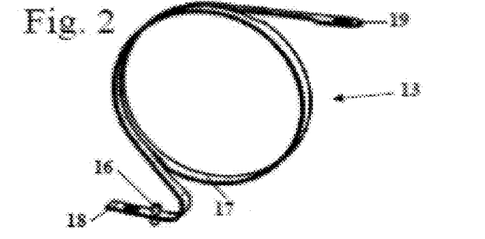
FIG. 2 shows a perspective illustration of the brake band of the power saw shown in FIG. 1.

To activate the braking device 10, a hand protector 11 is mounted on the housing 2, extending on that side of the tubular handle 4 which faces towards the guide bar 5. The hand protector 11 activates the braking device 10 via a toggle-lever mechanism 25. The toggle-lever mechanism 25 is held in its two end positions by a spring 14, i.e. the non-activated position and the activated position of the braking device 10. The toggle-lever mechanism 25 engages on a release end 19, also shown in FIG. 2 and FIG. 3, of the brake band 13, and pulls the brake band 13 tight about the brake drum 12 when the braking device 10 is released. The other end, i.e. the fastening end 18 of the brake band 13, is fixed to the housing 2 of the power saw 1. As shown in FIG. 2, a bolt 16 is provided on the brake band 13 at the fastening end 18 and can be used to fix the brake band 13 in the housing 2.

The power saw 1 shown in FIG. 1 moreover has an additional braking device 15 for activating the braking device 10. The additional braking device 15 serves as a run-down brake for the saw chain 6, and is activated upon release of a throttle lever 22 mounted on the rear handle 3.

Figure 3:
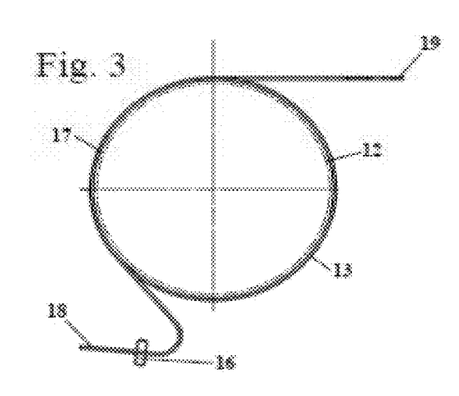
FIG. 3 shows a side view of the brake band shown in FIG. 2.

As shown in FIG. 3, the brake band 13 has, on its inner side facing towards the brake drum 12, a contact surface 17, with which the brake band 13 bears, in the tightened state of the braking device 10, against the external circumference of the brake drum 12, and as a result decelerates the latter. The contact surface 17 is formed on a marginal layer 21 of the brake band, this being shown schematically in FIG. 4.

Figure 4:
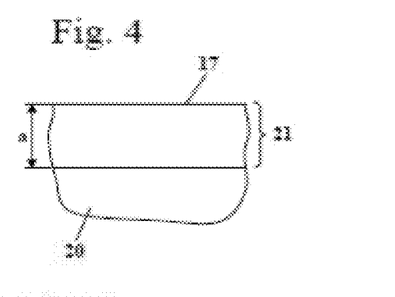
FIG. 4 shows a schematic illustration of the marginal layer of the brake band.

As shown in FIG. 4, the brake band 13 has a base body 20, on which the marginal layer 21 is formed. The base body 20 is a stainless, austenitic steel, a duplex steel, a super duplex steel, a nickel-base alloy or a cobalt-base alloy, in particular a stellite alloy.

Embodiments of the present application may utilize an austenitic steel for the base body 20 of the brake band 13, for example, one of the following alloys: 1.4301; 1.4310; 1.4305; 1.4401; 1.4404; 1.4435; 1.4571; 1.4580; 1.4944; 1.4980; 1.4539; AISI 316; AISI 304.

Further embodiments of the present application may utilize the composition of these steels and of further steels suitable for the base body 20 of the brake band, as listed in the table below:

| Mat. No. | Chemical analysis in % by weight | | | | | | | | |
|---|---|---|---|---|---|---|---|---|---|
| | C | Si | Mn | P≤ | S≤ | Cr | Mo | Ni | Fe Other |
| 1.4003 | ≤0.03 | ≤1.00 | ≤1.50 | 0.040 | 0.015 | 10.5-12.5 | — | 0.30-1.00 | Rem. N ≤ 0.030 |
| 1.4006 | 0.08-0.15 | ≤1.00 | ≤1.50 | 0.040 | 0.015 | 11.5-13.5 | — | ≤0.75 | Rem. — |
| 1.4016 | ≤0.08 | ≤1.00 | ≤1.00 | 0.040 | 0.015 | 16.0-18.0 | — | — | Rem. — |
| 1.4108 | 0.25-0.35 | ≤1.00 | ≤1.00 | 0.030 | 0.025 | 14.0-16.0 | 0.85-1.10 | ≤0.50 | Rem. N 0.30-0.50 |
| 1.4162 | ≤0.04 | ≤1.00 | 4.0-6.0 | 0.040 | ≤0.015 | 21.0-22.0 | 0.10-0.80 | 1.35-1.70 | Rem. Cu 0.10-0.80; N 0.20-0.25 |
| 1.4301 | ≤0.07 | ≤1.00 | ≤2.00 | 0.045 | 0.015 | 17.5-19.5 | — | 8.00-10.5 | Rem. N ≤ 0.11 |
| 1.4305 | ≤0.10 | ≤1.00 | ≤2.00 | 0.045 | 0.15-0.35 | 17.0-19.0 | — | 8.00-10.0 | Rem. Cu ≤ 1.00; N ≤ 0.11 |
| 1.4306 | ≤0.030 | ≤1.00 | ≤2.00 | 0.045 | 0.015 | 18.0-22.0 | — | 10.0-12.0 | Rem. N ≤ 0.11 |
| 1.4307 | ≤0.030 | ≤1.00 | ≤2.00 | 0.045 | 0.015 | 17.5-19.5 | — | 8.00-10.5 | Rem. N ≤ 0.11 |
| 1.4310 | 0.05-0.15 | ≤2.00 | ≤2.00 | 0.045 | 0.015 | 16.0-19.0 | ≤0.80 | 6.00-9.50 | Rem. N ≤ 0.11 |
| 1.4319 | ≤0.070 | ≤1.00 | ≤2.00 | 0.045 | 0.030 | 16.0-18.0 | — | 6.00-8.00 | Rem. N ≤ 0.11 |
| 1.4362 | ≤0.030 | ≤1.0 | ≤2.0 | ≤0.035 | 0.015 | 22.0-24.0 | 0.10-0.60 | 3.50-5.50 | Rem. Cu 0.10-0.60; N 0.05-0.20 |
| 1.4401 | ≤0.07 | ≤1.00 | ≤2.00 | 0.045 | 0.015 | 16.5-18.5 | 2.00-2.50 | 10.0-13.0 | Rem. N ≤ 0.11 |
| 1.4404 | ≤0.07 | ≤1.00 | ≤2.00 | 0.045 | 0.015 | 16.5-18.5 | 2.00-2.50 | 10.0-13.0 | Rem. N ≤ 0.11 |
| 1.4410 | ≤0.030 | ≤1.00 | ≤2.00 | 0.035 | 0.015 | 24.0-26.0 | 3.00-5.00 | 6.00-8.00 | Rem. N 0.24-0.35 |
| 1.4429 | ≤0.030 | ≤1.00 | ≤2.00 | 0.045 | 0.015 | 16.5-18.5 | 2.5-3.0 | 11.0-14.0 | Rem. N 0.12-0.22 |
| 1.4435 | ≤0.030 | ≤1.00 | ≤2.00 | 0.045 | 0.015 | 17.0-19.0 | 2.50-3.00 | 12.5-15.0 | Rem. N ≤ 0.11 |
| 1.4436 | ≤0.05 | ≤1.00 | ≤2.00 | 0.045 | 0.015 | 16.5-18.5 | 2.50-3.00 | 10.5-13.0 | Rem. N ≤ 0.11 |
| 1.4460 | ≤0.05 | ≤1.00 | ≤2.00 | 0.035 | 0.015 | 25.0-28.0 | 1.3-2.0 | 4.50-6.50 | Rem. N 0.05-0.20 |
| 1.4462 | ≤0.030 | ≤1.00 | ≤2.00 | 0.035 | 0.015 | 21.0-23.0 | 2.50-3.50 | 4.50-6.50 | Rem. N 0.10-0.22 |
| 1.4501 | ≤0.03 | ≤1.00 | ≤1.00 | 0.035 | 0.015 | 24.0-26.0 | 3.00-4.00 | 6.00-8.00 | Rem. Cu 0.50-1.00; N 0.20-0.30; W 0.50-1.00 |
| 1.4507 | ≤0.030 | ≤0.70 | ≤2.00 | 0.035 | 0.015 | 24.0-26.0 | 2.70-4.00 | 5.50-7.50 | Rem. N 0.15-0.30 |
| 1.4529 | ≤0.02 | ≤0.50 | ≤1.00 | 0.030 | 0.01 | 19.0-21.0 | 6.00-7.00 | 24.0-26.0 | Rem. N 0.15-0.25 Cu 0.50-1.50; |
| 1.4534 | ≤0.05 | ≤0.10 | ≤0.10 | 0.010 | 0.008 | 12.25-13.25 | 2.00-2.50 | 7.50-8.50 | Rem. Ti ≤ 0.1; N ≤ 0.01; Al 0.80-1.35 |
| 1.4539 | ≤0.02 | ≤0.70 | ≤2.00 | 0.030 | 0.010 | 19.0-21.0 | 4.00-5.00 | 24.0-26.0 | Rem. Cu 1.20-2.00; N ≤ 0.15 |
| 1.4541 | ≤0.08 | ≤1.00 | ≤2.00 | 0.045 | 0.015 | 17.0-19.0 | — | 9.00-12.00 | Ti (5xC) ≤ 0.70 |
| 1.4542 | ≤0.07 | ≤0.70 | ≤1.50 | 0.04 | 0.015 | 15.0-17.0 | ≤0.60 | 3.00-5.00 | Rem. Nb 5xC - 0.45; Cu 3.00-5.00 |
| 1.4545 | ≤0.07 | ≤1.00 | ≤1.00 | 0.030 | 0.015 | 15.0-15.5 | ≤0.50 | 3.00-5.50 | Rem. Nb ≥ (5xC) ≤ 0.45; Cu 2.50-4.50 |
| 1.4547 | ≤0.02 | ≤0.70 | ≤1.00 | 0.030 | 0.01 | 19.5-20.5 | 6.00-7.00 | 17.5-18.5 | Rem. Cu 0.50-1.00; N 0.18-0.25 |
| 1.4562 | ≤0.15 | ≤0.30 | ≤2.00 | 0.02* | 0.01* | 26.0-28.0 | 6.00-7.00 | 30.0-32.0 | Rem. Cu 1.00-1.40; N 0.15-0.25 |
| 1.4563 | ≤0.02 | ≤0.70 | ≤2.00 | 0.030 | 0.01 | 26.0-28.0 | 3.00-4.00 | 30.0-32.0 | Rem. Cu 0.70-1.50; N ≤ 0.11 |
| 1.4565 | ≤0.03 | ≤1.00 | 5.00-7.00 | 0.030 | 0.015 | 24.0-26.0 | 4.00-5.00 | 16.0-19.0 | Rem. N 0.30-0.60, Nb ≤ 0.150 |

-continued

| Mat. No. | Chemical analysis in % by weight | | | | | | | | | |
|---|---|---|---|---|---|---|---|---|---|---|
| | C | Si | Mn | P≤ | S≤ | Cr | Mo | Ni | Fe | Other |
| 1.4567 | ≤0.04 | ≤1.00 | ≤2.00 | 0.045 | ≤0.015 | 17.0-19.0 | — | 8.50-10.5 | Rem. | Cu 3.00-4.00; N ≤ 0.11 |
| 1.4568 | ≤0.09 | ≤0.70 | ≤1.00 | 0.004* | 0.015* | 16.0-18.0 | — | 6.50-7.80 | Rem. | Al 0.70-1.50 |
| 1.4571 | ≤0.08 | ≤1.00 | ≤2.00 | 0.045 | 0.015 | 16.5-18.5 | 2.00-2.50 | 10.0-13.5 | Rem. | Ti 5; C ≤ 0.70 |
| 1.4580 | ≤0.08 | ≤1.00 | ≤2.00 | 0.045 | 0.015 | 16.5-18.5 | 2.00-2.50 | 10.5-13.5 | Rem. | Nb (10xC) ≤ 1.00 |
| 1.4591 | ≤0.015 | ≤0.50 | ≤2.00 | 0.020 | 0.010 | 31.0-35.0 | 0.50-2.00 | 30.0-33.0 | Rem. | Cu 0.30-1.20; N 0.35-0.60 |
| 1.4652 | ≤0.02 | ≤0.50 | 2.00-4.00 | 0.030 | 0.005 | 23.0-25.0 | 7.00-8.00 | 21.0-23.0 | Rem. | Cu 0.30-0.60; N 0.45-0.55 |
| 1.4662 | ≤0.02 | ≤0.70 | 1.00-3.00 | | | 20.0-24.0 | 1.50-3.50 | 3.50-9.00 | Rem. | N ≤ 0.27 |
| 1.4845 | ≤0.10 | ≤1.50 | ≤2.00 | 0.045 | 0.015 | 24.0-26.0 | — | 19.0-22.0 | Rem. | N ≤ 0.11 |
| 1.4847 | ≤0.08 | ≤1.00 | ≤1.00 | 0.030 | 0.015 | 18.0-22.0 | — | 18.0-22.0 | Rem. | Al ≤ 0.60; Ti 0.60 |
| 1.4944 | ≤0.08 | ≤1.00 | ≤2.00 | 0.030 | 0.015 | 13.5-16.0 | 1.00-1.50 | 24.0-27.0 | Rem. | V 0.10-0.50, Al ≤ 0.35; B 0.003-0.010, Ti 1.90-2.30 |
| 1.4980 | 0.03-0.08 | ≤1.00 | 1.00-2.00 | 0.025 | 0.015 | 13.5-16.0 | 1.00-1.50 | 24.0-27.0 | Rem. | Alg/tot ≤ 0.35; B 0.003-0.010; V 0.10-0.50; Ti 1.90-2.30 |

The standards to which the designations of the steels mentioned in the table are directed are listed in the table below, with in each case German or European designations and standards and American designations and standards being indicated:

| Mat. No. | Material | Standard |
|---|---|---|
| 1.4003 | X2CrNi12 X2Cr11 S41050 | EN 10028-7: 2008-02; UNS; ASTM A 240; |
| 1.4006 | X12Cr13 X10Cr13 410, S41000 | DIN EN 10088-1: 2005-09; EN 10088-4/-5 AISI, UNS, AMS 5350, 5504, 5505, 5591, 5613, 5776, 5777, 5867, QQ-S-763, ASME SA-194, 240, 268, 479, ASTM A 1012, 1021, 1028, 182, 193, 194, 240, 268, 276, 314, 336, 473, 479, 493, 511, 580, 815, 837, 982, 988, ASTM F 1079, 116, 1613, 2215, 2281, 593, 594, 738, 836, 837, 899, SAE J 405, 467 |
| 1.4016 | X6Cr17 430 S43000 | DIN EN 10088-1: 2005-09 AISI, UNS, AMS 5503, 5627, AMS-QQ-S-763, ASME SA-182, 240, 268, 479, ASTM A 240, 268, 276, 314, 473, 479, 493, 511, 580, 815, ASTM F 2215, 2281, 594, 738, 836, 593, SAE J 405, 412 |
| 1.4108 | X30CrMoN15-1 AMS 5898* | SEW 400 AMS |
| 1.4162 | X2CrMnNiN21-5-1 Duplex | VdTUV-Wbl 556: 2011-09 DIN EN 10088-4; -5: 2010-01 |
| 4.4301 | X5CrNi18-10 X5CrNi18 9 (V2A) 304, S30400 | EN 10028-7; EN 10088-1; -2; -3; -4; -5; EN 10151; EN10216-5; EN 10217-7; EN 10222-5; EN 10250-4; EN 10263-5; EN 10264-4; EN 10269; EN 10272; EN 10296-2; EN 10297-2; EN 10312; 5512-3 AISI, UNS, ASME, SA-240, SAE |
| 1.4305 | X8CrNiS18-9/ X10CrNiS18 9 303, S30300, Type 1, 8F, 8FA, B8F, B8FA, 30303 | EN 10088-1; -2; -3; -5; EN 10297-2; EN 10312 AISI, UNS, AMS 5640, ASME SA-194, ASME SA-320, ASTM A 194, 314, 320, 473, 581, 582, 895, ASTM F 593, 594, 738, 836, 837, 880, 899, SAE J 412 |
| 1.4306 | X2CrNi19-11 304L, S30403 | DIN EN 10028-7: 2008-02 UNS, ASTM A 240, AISI, ASME SA-240, SAE |
| 1.4307 | X2CrNi18-9 304L, S30403 | DIN EN 10272: 2008-01 UNS, ASTM A 479, AISI, ASME SA-479, SAE |
| 1.4310 | X10CrNi18-8/ X12CrNi17 7/ 301, S30100, MT301, 30301 | EN 10088-1; -2; -3; EN 10151; EN 10263-5; EN 10264-4; EN 10270-3; EN 10312 AISI, UNS, AMS 5517, 5518, 5519, 5901, 5902, ASTM A 240, 554, 666, ASTM F 899, SAE J 405, 412 |

-continued

| Mat. No. | Material | Standard |
|---|---|---|
| 1.4319 | X5CrNi17-7<br>X3CrNiN 17-8<br>302 | EN 10088-1: 2005-09; EN 10312<br>AISI, ISO TS 15510 |
| 1.4362 | X2CrNiN23-4<br>SAF2304, S32304<br>Duplex | DIN EN 10028-7: 2008-02<br>AISI, ASTM A 240, UNS |
| 1.4401 | X5CrNiMo17-12-2<br>X5CrNiMo18 10<br>(V4A)<br>316, S31600 | EN 10028-7; EN 10088-1; -2; -3; -4; -5; EN 10151;<br>EN 10216-5; EN 10217-7; EN 10222-5; EN 10250-4;<br>EN 10263-5; EN 10264-4; EN 10269; EN 10270-3;<br>EN 10272; EN 10296-2; EN 10297-2; EN 10312;<br>5512-3<br>AISI; UNS, ASTM A 240, ASME SA-240, SAE |
| 1.4404 | X2CrNiMo17-12-2<br>X2CrNiMo17-13-2<br>316L, S31603 | DIN EN 10028-7: 2008-02<br>AISI; UNS, ASTM A 240, ASME SA-240, SAE |
| 1.4410 | X2CrNiMoN25-7-4<br>Super Duplex<br>SAF 2507, S32750 | EN 10028-7<br>ASTM A240, UNS |
| 1.4429 | X2CrNiMoN17-13-3<br>316LN, S31653 | DIN EN 10028-7: 2008-02<br>AISI, ASTM A 240, SAE, UNS |
| 1.4435 | X2CrNiMo18-14-3<br>316L, S31603 | EN 10028-7; EN 10088-1; -2; -3; -4; -5; EN 10216-5;<br>EN 10217-7; EN 10222-5; EN 10250-4; EN 10272;<br>EN 10296-2; EN 10297-2; EN 10312<br>AISI, UNS, ASTM A 240, ASME SA-240, SAE |
| 1.4436 | X3CrNiMo17-13-3<br>X5CrNiMo17-13-3<br>316, S31600 | DIN EN 10028-7: 2008-02<br>AISI, ASTM A 240, ASME SA 240, SAE, UNS |
| 1.4460 | X3CrNiMoN27-5-2<br>X4CrNiMoN27 5 2<br>Duplex 329, S31260 | EN 10088-1; -3; -5; EN 10250-4; EN 10297-2<br>AISI, UNS, SAE, ASTM A 790 |
| 1.4462 | X2CrNiMoN22-5-3<br>Duplex<br>SAF2205, S32205, S31803 | EN 10028-7; EN 10088-1; -2; -3; -4; -5; EN 10216-5;<br>EN 10217-7; EN 10222-5; EN 10250-4; EN 10263-5;<br>EN 10272; EN 10296-2; EN 10297-2; EN 10312;<br>5512-3<br>AISI, UNS, ASTM A 240, ASME SA-182, 240, 789, 790, 815, SAE J 405 |
| 1.4501 | X2CrNiMoCuWN25-7-4<br>Super Duplex<br>S32760, Zeron 100 | DIN EN 10028-7: 2008-02<br>ASTM A 240, UNS |
| 1.4507 | X2CrNiMoCuN25-6-3<br>Super Duplex<br>255, S32520 | DIN EN 10028-7: 2008-02<br>ASTM A 240, UNS |
| 1.4529 | X1NiCRMoCuN25-20-7<br>Super Duplex<br>N08926 | DIN EN 10028-7: 2008-02<br>UNS, ASTM A 240 |
| 1.4534 | X3CrNiMoAl13-8-2<br>S13800, XM 13 | EN 3357; EN 3358; EN 3359; EN 4347; EN 4461;<br>EN 4462; EN 4463; EN 4464; EN 4465; EN 4466<br>UNS, ASTM A 276 |
| 1.4539 | X1NiCrMoCu25-20-5<br>Superaustenite<br>904L, N08904 | EN 10028-7; EN 10088-1; -2; -3; -4; -5;<br>EN 10216-5; EN 10217-7; EN 10222-5;<br>EN 10250-4; EN 10272; EN 10296-2; EN 10297-2;<br>EN 10312; AISI, UNS, ASTM A 240 |
| 1.4541 | X6CrNiTi18-10<br>321, S32100 | DIN EN 10028-7: 2008-02<br>ASTM A 240, AISI, ASME SA-240, SAE, UNS |
| 1.4542 | X5CrNiCuNb16-4<br>S17400, 630, F, 17-4PH | DIN EN 10088-1; -2; -3; -4; -5; EN 10250-4; EN 3973<br>AISI, UNS, AMS 5604, 5622, 5643, AS7474, ASME<br>SA 564, ASME SA 705, ASTM A 1028, 564, 693,<br>705, 982, ASTM F<br>593, 594, 738, 836, 899, SAE J 467 |
| 1.4545 | X5CrNiCu15-5<br>S15500, XM-12 | DIN EN 2821; EN 3361; EN 3479<br>AISI, UNS, AMS 5659, 5826, 5862,<br>ASME SA-705, ASTM A 564, 693, 705 |
| 1.4547 | X1CrNiMoCuN20-18-7<br>Superaustenite<br>S31254, 254, Uranus B25 | DIN EN 10028-7: 2008-02<br>SMO, UNS, ASTM A 240, ASME SA-240 |
| 1.4562 | X1NiCrMoCu32-28-7<br>Superaustenite<br>N08031 | SEW 400: 1997-02<br>UNS, ASTM A 314, 366, 462, 564, 581, 619, 622,<br>625, 626, ASTM B 649, 924 |
| 1.4563 | X1NiCrMoCu31-27-4<br>Superaustenite<br>N08028 | DIN EN 10028-7: 2008-02<br>UNS |

-continued

| Mat. No. | Material | Standard |
|---|---|---|
| 1.4565 | X2CrNiMnMoN25-18-6-5 Superaustenite S43565, F49, 403, WPS34565 | DIN EN 10088-1: 2005-09 UNS, ASTM A 1012, 182, 213, 240, 249, 269, 276, 312, 358, 403, 409, 479, 480, 943, SAE J 405 |
| 1.4567 | X3CrNiCu18-9-4 X3CrNiCu18 9 302 HQ, S30430 | DIN EN 10269: 2006-07 AISI, UNS, ASTM A 493, ASTM F 593, 594, 836, 837, 879, 880, 899, 738, MIL-S-24149/6, MIL-S-24149/3, SAE J 775 |
| 1.4568 | X7CrNiAl17-7 S32760, S17700, 631, 622, 17-7PH, X7CrNiAl17-7 | DIN EN 10088-1; -2; -3; -4; -5; EN 10151; EN 10270-3 UNS, ASTM 631, AMS 5528, 5529, 5568, 5644, 5678, ASME SA-705, ASTM A 313, 564, 579, 693, 705, ASTM F 899, SAE J 217, 467 |
| 1.4571 | X6CrNiMoTi17-12-2 316Ti, S31635 | EN 10028-7; EN 10088-1; -2; -3; -4; -5; EN 10216-5; EN 10217-7; EN 10222-5; EN 10250-4; EN 10263-5; EN 10272; EN 10296-2; EN 10297-2; EN 10312; 5512-3 AISI, UNS, ASTM A 240, SAE |
| 1.4580 | X6CrNiMoNb17-12-2 316Cb, S31640 | EN 10028-7; EN 10088-1; -2; -3; EN 10216-5; EN 10272; EN 10297-2; EN 10312 UNS, ASTM A 240, SAE |
| 1.4591 | X1CrNiMoCuN33-32-1 Superaustenite R20033 | SEW 400: 1997-02 UNS, ASTM B 366, 462, 472, 564, 619, 622, 625, 626, 649, 924 |
| 1.4652 | X1CrNiMoCuN24-22-8 Superaustenite S32654 | DIN EN 10088-1: 2005-09 UNS, ASTM A 1012, 240, 249, 269, 276, 312, 358, 479, 480, 688, 988, SAE J 405 |
| 1.4662 | X2CrNiMnMoCuN24-4-3-2 alloy 2205; Duplex | ASTM, UNS, S82441 |
| 1.4845 | X8CrNi25-21 Duplex 310S, S31008 | DIN EN 10088-1: 2005-09 AISI, UNS, AMS, ASME, ASTM A, SAE |
| 1.4847 | X8CrNiAlTi20-20 334 | AISI |
| 1.4944 | X5NiCrTiMoV26-15 Duplex S66286 | SEW 390: 1991-11 AISI 660, UNS, AMS 5731, 5732, 5734, 5735, 5736, 5737 |
| 1.4980 | X6NiCrTiMoVB25-15-2/ X5NiCrTi26-15 660, 566286, A286 | EN 10088-1; EN 10269; EN 10302 UNS, AMS 5525, 5726, 5731, 5732, 5734, 5737, 5804, 5805, 5810, 5853, 5858, 5895, AMS AS7235, AS7477, AS7478, AS7479, AS7481, AS7482, ASME SA-638, ASTM A 453, 638, ASTM F 2281, SAE J 467 |

In embodiments of the present application, duplex or super duplex steels can be, for example, 1.4462, 1.4944, 1.4980 or SAF 2507. These are likewise listed in the tables above.

In embodiments of the present application, nickel-base alloys can be, for example, the materials listed in the table below:

| Mat No. | Chemical analysis in % by weight ||||||||||||
|---|---|---|---|---|---|---|---|---|---|---|---|---|
| | C | Si | Mn | P≤ | S≤ | Cr | Fe | Mo | W | Co | Ni | Other |
| 2.4600 | ≤0.01 | ≤0.1 | ≤3.0 | 0.030 | 0.015 | 1.0-3.0 | 1.0-3.0 | 27.0-32.0 | ≤3.0 | ≤3.0 | ≥65.0 | Al 0.1-0.5; Cu ≤0.5 |
| 2.4602 | ≤0.015 | ≤0.08 | ≤0.5 | 0.020 | 0.02 | 20.0-22.5 | 2.0-6.0 | 12.5-14.5 | 2.5-3.5 | ≤2.5 | Rem. | V ≤ 0.35 |
| 2.4610 | ≤0.015 | ≤0.08 | ≤1.0 | 0.025 | 0.015 | 11.0-18.0 | 3.2 | 14.0-17.0 | — | ≤2.0 | Rem. | Cu ≤ 0.5; Ti 0.75-1.3 |
| 2.4612 | ≤0.02 | ≤0.2 | — | — | — | 14.0-18.0 | ≤3.0 | 14.0-17.0 | — | ≤0.5 | ≥56 | Ti ≤ 0.7; S ≤ 0.015; Mn ≤ 1.0 |
| 2.4616 | ≤0.02 | ≤0.2 | — | — | — | ≤1.0 | ≤2.0 | 26.0-30.0 | ≤1.0 | | ≥64.5 | Mn ≤ 2.0; S ≤ 0.05; V ≤ 0.4; Cu ≤ 0.5 |
| 2.4619 | ≤0.015 | ≤1.0 | ≤1.0 | 0.040 | 0.03 | 21.0-23.5 | 18.0-21.0 | 6.0-8.0 | ≤1.5 | ≤5.0 | 40 | Cu 1.5-2.5; Nb ≤ 0.5 |
| 2.4663 | 0.05-0.15 | ≤1.00 | ≤1.00 | — | 0.015 | 20.0-24.0 | ≤3.0 | 8.0-10.0 | — | 10.0-15.0 | ≥44.50 | Al 0.8-1.5; Ti ≤ 0.6; Cu ≤ 0.5; B ≤ 0.006 |

-continued

| Mat No. | C | Si | Mn | P≤ | S≤ | Cr | Fe | Mo | W | Co | Ni | Other |
|---|---|---|---|---|---|---|---|---|---|---|---|---|
| 2.4665 | 0.05-0.15 | ≤1.0 | ≤1.0 | 0.020 | 0.015 | 20.5-23.0 | 17.0-20.0 | 8.0-10.0 | 0.2-1.0 | 0.5-2.5 | Rem. | Al ≤ 0.5; Cu ≤ 0.5; B ≤ 0.010 |
| 2.4668 | 0.02-0.08 | ≤0.35 | ≤0.35 | 0.015 | 0.015 | 17.0-21.0 | 10.0-12.0 | 2.8-3.3 | — | ≤1.0 | 50.0-55.0 | Al 0.3-0.7; B 0.002-0.006; Nb + Ta 5; Cu ≤ 0.3; Ti 0.6-1.2 |
| 2.4675 | ≤0.01 | 0.08 | ≤0.50 | 0.025 | 0.01 | 22.0-24.0 | ≤3.0 | 15.0-17.0 | — | ≤2.0 | Rem. | Al ≤ 0.5; Cu 1.3-1.9 |
| 2.4694 | ≤0.1 | ≤0.5 | ≤1.0 | — | 0.01 | 14.0-17.0 | 5.0-9.0 | — | — | — | ≥70.0 | Al 0.9-1.5; Cu ≤ 0.5; Nb 0.7-1.2; Ti 2.0-2.6 |
| 2.4733 | 0.05-0.15 | 0.25-0.75 | 0.3-1.0 | 0.03 | 0.015 | 20.0-24.0 | ≤3.0 | 1.0-3.0 | 13.0-15.0 | ≤5.0 | Rem. | Al 0.2-0.5; B ≤ 0.015; La 0.005-0.05 |
| 2.4816 | 0.05-0.1 | ≤0.5 | ≤1.0 | 0.02 | 0.015 | 14.0-17.0 | 6.0-10.0 | — | — | — | 72.0 | Al ≤ 0.3; Cu ≤ 0.5; Ti ≤ 0.3 |
| 2.4819 | ≤0.01 | ≤0.08 | ≤1.0 | 0.025 | 0.01 | 14.5-16.5 | 4.0-7.0 | 15.0-17.0 | 3.0-4.5 | ≤2.5 | Rem. | V ≤ 0.35 |
| 2.4851 | 0.03-0.1 | ≤0.5 | ≤1.0 | 0.020 | 0.015 | 21.0-25.0 | ≤18.0 | — | — | — | 58.0-63.0 | Al 1.0-1.7; Cu ≤ 0.5; Ti ≤ 0.5 |
| 2.4856 | 0.03-0.1 | ≤0.5 | ≤0.5 | 0.020 | 0.015 | 20.0-23.0 | ≤5.0 | 8.0-10.0 | — | ≤1.0 | 58.0 | Al ≤ 0.4; Cu ≤ 0.5; Ti ≤ 0.4 |
| 2.4858 | ≤0.025 | ≤0.5 | ≤1.0 | 0.02 | 0.015 | 19.5-23.5 | 20.04 | 2.5-3.5 | — | ≤1.0 | 38.0-46.0 | Al ≤ 0.2; Cu 1.5-3.0; Ti 0.6-1.2 |
| 2.4883 | ≤0.12 | ≤0.50 | ≤1.0 | — | — | 15.5-17.5 | 4.5-7.0 | 16.0-18.0 | 3.75-5.25 | ≤2.5 | Rem. | |

In embodiments of the present application, the cobalt-base alloys can be, for example, the alloy having the material number 2.4979 (Stellite 21 (corresponds to R30021 in accordance with UNS), Stellite 6b (R30016 in accordance with UNS) or Stellite 6 (R30106 in accordance with UNS)). Stellite is a brand name of Deloro Stellite Holdings Corporation.

Other materials for use herein would be apparent to one of ordinary skill in the art.

In yet another embodiment, to produce the brake band 13, carbon and/or nitrogen is made to diffuse into the brake band 13 at a temperature of less than 500° C., in particular of less than 300° C. If the carbon and/or nitrogen is made to diffuse at higher temperatures, carbides can form upon carbonitriding above approximately 650° C. and nitrides can form upon nitriding above approximately 500° C., these leading to embrittlement of the marginal layer 21. The diffusion is effected over a period of time of more than 48 hours, in particular of more than 96 hours. In particular, exclusively carbon is made to diffuse. The duration of the diffusion process is advantageously 6 to 7 days. The brake drum 12, with which the thus treated brake band 13 interacts, advantageously consists of a steel with a body-centered cubic or tetragonally distorted lattice structure. The surface of the brake drum 12 is advantageously not hardened or coated.

In a further embodiment, alternatively, it can also be provided that the brake band 13 consists of a steel with a body-centered cubic or tetragonally distorted lattice structure and the brake drum 12 has a marginal layer 21 into which carbon and/or nitrogen have been made to diffuse. A brake drum 12 with a marginal layer 21 is shown schematically in FIG. 5. In this case, the brake drum 12 consists in particular of a stainless, austenitic steel, a duplex steel, a super duplex steel, a nickel-base alloy or a stellite alloy, in particular of one of the abovementioned alloys.

Figure 5:
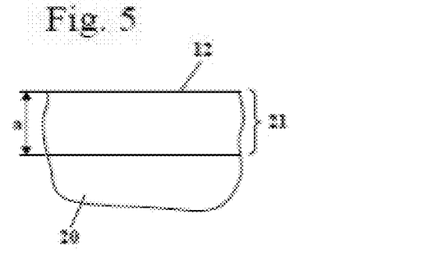
FIG. 5 shows a schematic illustration of a marginal layer of a brake drum.

The carbon content in the marginal layer 21 is approximately 1% by weight to approximately 7% by weight. The carbon and/or nitrogen is dissolved upon diffusion into interstitial lattice sites, and does not form any carbides or nitrides, respectively. The carbide proportion in the marginal layer 21 is therefore very small. The carbide proportion in a marginal layer 21 into which carbon has been made to diffuse is advantageously less than approximately 0.5% by weight. If nitrogen has been made to diffuse, the nitride proportion in the marginal layer 21 is advantageously very low, and is less than approximately 1% by weight, in particular less than approximately 0.5% by weight. The hardness of the marginal layer 21 is advantageously in the range of approximately 700 HV to approximately 1200 HV (Vickers hardness). The hardness of the marginal layer 21 is approximately 150% to approximately 600% of the hardness of the base body 20. Despite the high hardness of the marginal layer 21, the brake band 13 or the brake drum 12 with a marginal layer 21 does not undergo embrittlement.

The marginal layer 21 has a thickness a of approximately 5 μm to approximately 50 μm, in particular of approximately 15 μm to approximately 35 μm. The thickness a can in this case be smaller than the material removed by wear during operation. It has been found that the shortening of the braking time is also achieved when the wear is greater than the thickness a of the marginal layer 21, into which carbon and/or nitrogen has been made to diffuse.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

The invention claimed is:

1. A hand-held work implement comprising a tool and a braking device for the tool,
wherein the braking device comprises a brake band, which wraps around a brake drum, wherein the brake band and the brake drum form a first part and a second part undergoing friction which move relative to one another during the braking operation, wherein the first part undergoing friction is an austenitic steel, a duplex steel, super duplex steel, a nickel-base alloy or a cobalt-base alloy, wherein the first part undergoing friction has a base body and a marginal layer, wherein the base body and the marginal layer comprise the same base material, wherein the marginal layer comprises diffused carbon or nitrogen embedded in a matrix of the base material such that the hardness of the marginal layer is approximately 150% to approximately 600% of the hardness of the base body, and wherein a carbide proportion in the marginal layer is less than approximately 0.5% by weight.

2. The hand-held work implement according to claim 1, wherein the marginal layer has a thickness of approximately 5 µm to approximately 50 µm.

3. The hand-held work implement according to claim 1, wherein a nitride proportion in the marginal layer is less than approximately 1%.

4. A hand-held work implement comprising a tool and a braking device for the tool,
wherein the braking device comprises a brake band, which wraps around a brake drum, wherein the brake band and the brake drum form a first part and a second part undergoing friction which move relative to one another during the braking operation, wherein the first part undergoing friction is an austenitic steel, a duplex steel, super duplex steel, a nickel-base alloy or a cobalt-base alloy, wherein the first part undergoing friction has a base body and a marginal layer, wherein the base body and the marginal layer comprise the same base material, wherein the marginal layer comprises diffused carbon or nitrogen embedded in a matrix of the base material such that the hardness of the marginal layer is approximately 150% to approximately 600% of the hardness of the base body, and wherein a carbide proportion in the marginal layer is less than approximately 0.5% by weight, wherein a carbon content in the marginal layer is approximately 1% by weight to approximately 7% by weight.

5. The hand-held work implement according to claim 1, wherein a nitrogen proportion in the marginal layer is approximately 5% by weight to approximately 12% by weight.

6. The hand-held work implement according to claim 1, wherein the first part undergoing friction is the brake band.

7. The hand-held work implement according to claim 1, wherein the first part undergoing friction is the brake drum.

8. The hand-held work implement according to claim 1, wherein the first part undergoing friction is a stainless, austenitic steel.

9. The hand-held work implement according to claim 1, wherein the second part undergoing friction is a steel with a body-centered cubic lattice structure.

10. A process for producing a braking device of a hand-held work implement, wherein the work implement has a tool and a braking device for the tool, wherein the braking device comprises a brake band, which wraps around a brake drum, wherein the brake band and the brake drum form a first part and a second part undergoing friction which move relative to one another during the braking operation, wherein a first part undergoing friction is an austenitic steel, a duplex steel, a super duplex steel, a nickel-base alloy or a cobalt-base alloy, and carbon and/or nitrogen is made to diffuse into a marginal layer of the first part undergoing friction at a temperature of less than 500° C.

11. The process according to claim 10, wherein the diffusion is effected over a period of time of more than 48 hours.

12. The process according to claim 10, wherein the diffusion is effected over a period of time of more than 96 hours.

13. The process according to claim 10, wherein only carbon is made to diffuse into the marginal layer.

14. The hand-held work implement according to claim 1, wherein the second part undergoing friction is a steel with a tetragonally distorted lattice structure.

* * * * *